United States Patent
Zhu et al.

(10) Patent No.: US 7,040,033 B2
(45) Date of Patent: May 9, 2006

(54) SIX DEGREES OF FREEDOM PRECISION MEASURING SYSTEM

(75) Inventors: Zhenqi Zhu, Hoboken, NJ (US);
Hongliang Cui, Jersey City, NJ (US)

(73) Assignee: Trustees of Stevens Institute of Technology, Hoboken, NJ (US)

( * ) Notice: Subject to any disclaimer, the term of this patent is extended or adjusted under 35 U.S.C. 154(b) by 0 days.

(21) Appl. No.: 10/265,538

(22) Filed: Oct. 4, 2002

(65) Prior Publication Data

US 2003/0070311 A1    Apr. 17, 2003

Related U.S. Application Data

(60) Provisional application No. 60/327,244, filed on Oct. 5, 2001.

(51) Int. Cl.
*G01D 21/00* (2006.01)
*G01B 5/008* (2006.01)

(52) U.S. Cl. ................................ 33/502; 33/556
(58) Field of Classification Search ................ 33/1 M, 33/501–503, 556–558
See application file for complete search history.

(56) References Cited

U.S. PATENT DOCUMENTS

| | | | |
|---|---|---|---|
| 4,435,905 A | 3/1984 | Bryan | 33/181 R |
| 4,777,818 A | 10/1988 | McMurtry | 73/1 R |
| 4,884,348 A | 12/1989 | Zeller et al. | 33/502 |
| 5,052,115 A | 10/1991 | Burdekin | 33/502 |
| 5,111,590 A | 5/1992 | Park | 33/502 |
| 5,214,857 A | 6/1993 | McMurtry et al. | 33/502 |
| 5,428,446 A | 6/1995 | Ziegert et al. | 356/358 |
| 5,533,271 A | 7/1996 | Callaghan, Jr. | 33/502 |
| 5,647,136 A | 7/1997 | Jostlein | 33/502 |
| 5,681,981 A | 10/1997 | McMurtry | 73/1 J |
| 5,720,209 A | 2/1998 | Bailey et al. | 82/152 |
| 5,767,380 A | 6/1998 | Haas | 73/1.79 |
| 5,791,843 A | 8/1998 | Dreier | 409/218 |
| 5,797,191 A * | 8/1998 | Ziegert | 33/503 |
| 5,813,128 A | 9/1998 | Bailey | 33/502 |
| 5,836,082 A * | 11/1998 | Sheldon | 33/556 |
| 5,870,834 A * | 2/1999 | Sheldon | 33/556 |
| 5,900,938 A | 5/1999 | Huang | 356/358 |
| 5,909,939 A | 6/1999 | Fugmann | 33/503 |
| 6,021,579 A * | 2/2000 | Schimmels et al. | 33/503 |
| 6,024,526 A * | 2/2000 | Slocum et al. | 414/226.01 |
| 6,086,283 A | 7/2000 | Ziegert | 403/57 |
| 6,205,839 B1 | 3/2001 | Brogårdh et al. | 73/1.79 |
| 6,226,884 B1 * | 5/2001 | McMurtry | 33/557 |
| 6,286,225 B1 * | 9/2001 | Schimmels et al. | 33/556 |
| 6,330,837 B1 * | 12/2001 | Charles et al. | 74/490.06 |
| 6,662,461 B1 * | 12/2003 | McMurtry | 33/503 |
| 6,681,495 B1 * | 1/2004 | Masayuki et al. | 33/502 |

* cited by examiner

*Primary Examiner*—Yaritza Guadalupe
(74) *Attorney, Agent, or Firm*—Licata & Tyrrell P.C.

(57) ABSTRACT

The present invention relates to apparatuses and methods for calibrating relative motions of moveable parts using plurality of balls, rods, and liner encoders which form configurations to measure multiple translational, angular and squareness errors simultaneously.

4 Claims, 4 Drawing Sheets

US 7,040,033 B2

SIX DEGREES OF FREEDOM PRECISION MEASURING SYSTEM

INTRODUCTION

This application claims the benefit of priority from U.S. provisional patent application Ser. No. 60/327,244 filed Oct. 5, 2001.

FIELD OF INVENTION

The present invention relates to an apparatus for simultaneously measuring six types of motion errors in precision machines and robots. This invention is useful for evaluating machine tool performance, evaluating the performance of industrial robots, evaluating the motion errors of other types of machines, calibrating machine tools and industrial robots, calibrating any other multi-axis motion system and for use as a six degree of freedom ruler for dimensional measurement.

BACKGROUND OF THE INVENTION

Various types of motion systems are routinely employed in the technical fields of robotics, automation, machining, medical imaging, computer disk drives, and a number of other fields of technology. A motion control system employed in such motion systems typically includes a digital or analog controller responsive to command inputs, an amplifier/driver, and a linear or rotary actuator coupled to a mechanical system, such as a mechanical tool or a joint of a robotic arm. Motion control systems may be implemented for operation in either an open-loop or closed-loop configuration. In a closed-loop configuration, feedback sensors are generally employed to provide the controller with data concerning the actuator and mechanical system during operation. A high degree of control is required in many types of precision motion systems, as any unintended residual vibration or movement during operation of the system may have costly and unintended consequences. Undesirable vibration within a motion system employed in a medical imaging system, for example, may result in various types of imperfections in an imaging process. Unacceptable levels of surface roughness, by way of further example, may result from unwanted vibration occurring within a motion system employed in high precision machining equipment. It is well appreciated in the art that unwanted vibrations or oscillations are of primary concern in many high-precision motion system applications. A number of techniques have been developed to reduce undesirable vibrations or oscillations associated with movement of a motor in a motion system.

U.S. Pat. No. 5,111,590 describes a computer aided kinematic transducer link system for assessing contouring accuracy of machine tools. U.S. Pat. No. 5,767,380 describes a measuring arrangement for checking geometrical and dynamic accuracy of two numerically controlled and displaceable machine elements. U.S. Pat. No. 5,900,938 describes a laser measurement system for rapid calibration of machine tools including a measurement enhancement apparatus which enables an existing standard single degree of freedom laser interferometry system to simultaneously measure up to four added degrees of freedom.

Calibration equipment with plurality of axes of rotation suitable for rotatable connection to a fixed reference point of a tool or robot have been described in U.S. Pat. No. 5,909,939 and U.S. Pat. No. 6,205,839. Ball bar gauges for obtaining accuracy in numerical control machines are described in U.S. Pat. No. 4,435,905, U.S. Pat. No. 4,884,348, U.S. Pat. No. 5,052,115, U.S. Pat. No. 5,214,857, U.S. Pat. No. 5,428,446, U.S. Pat. No. 5,428,446, U.S. Pat. No. 5,533,271, U.S. Pat. No. 5,647,136, U.S. Pat. No. 5,681,981 U.S. Pat. No. 5,720,209 and U.S. Pat. No. 5,813,128. Jointed movable coordinate positioning apparatuses are described in U.S. Pat. No. 4,777,818, U.S. Pat. No. 5,791,843 and U.S. Pat. No. 6,086,283.

Although many of these previous approaches would appear to provide a measure of unwanted motion errors including vibration, such techniques often fail to provide the requisite level of precision measuring or simultaneous execution of measurement desirable for many applications. Further many of the apparatuses are time intensive to set up and execute and costly to operate. The present invention provides a measuring apparatus for precision machinery which measures the relative positioning accuracy between tool tip and workpiece defined by six different motions simultaneously.

SUMMARY OF THE INVENTION

An object of the present invention is to provide an apparatus for use in calibrating relative movements of parts of a machine made of a plurality of balls and rods, and a plurality of liner encoders which form configurations to measure multiple translational, angular and squareness errors simultaneously.

A further object of the present invention is to provide an apparatus for use in calibrating relative movements of parts of a machine comprising a plurality of balls, a plurality of rods, linear encoders, a top platform, and a bottom platform, wherein the balls and rods form ballbars to extend between the top platform and the bottom platform to form a configuration which measures multiple translational, angular and squareness errors simultaneously.

A further object of the present invention is to provide a method of calibrating a machine tool for translational, angular and squareness errors.

DETAILED DESCRIPTION OF THE INVENTION

Figure 1:
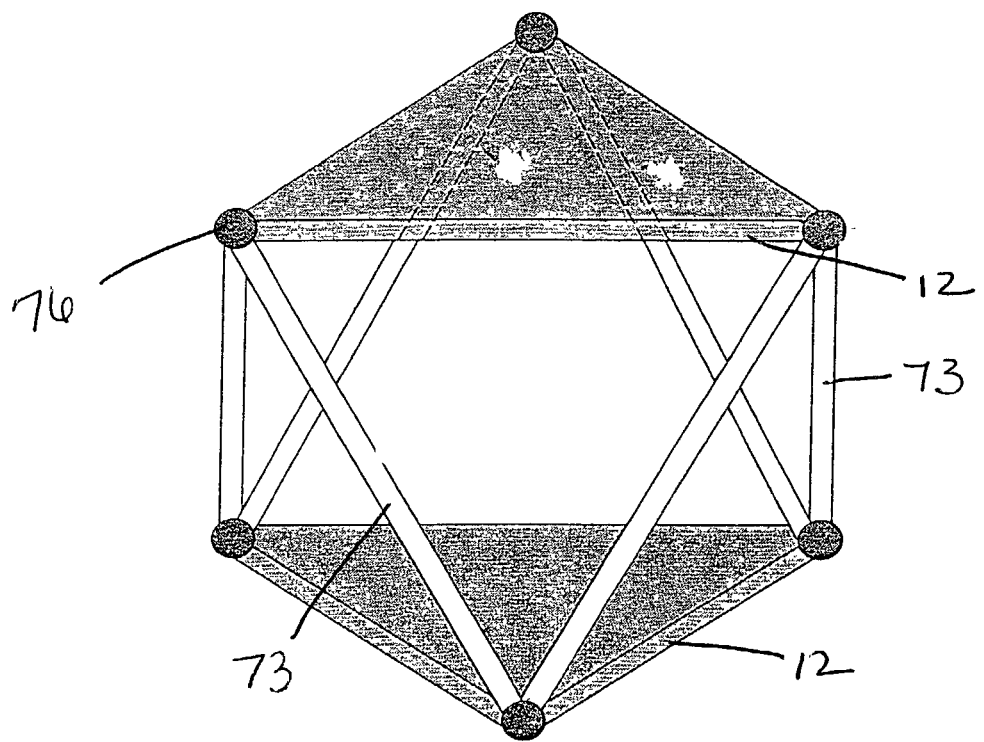
FIG. 1 is a schematic diagram of a measuring apparatus for precision calibration of a machine.

The present invention relates to ball bars and their use in calibrating machines. Existing measuring methods either measure motion errors one at a time or utilize complicated set up procedures. For example a 6-channel laser interferometer system consisting of one laser head, 6 laser interferometers, receivers, and various optical lenses require hours of set up time to measure six motion errors of a precision machine. Measurement of the six degrees of freedom motion errors in precision machinery is the most costly and time consuming measurement method. As a consequence of the time and expense required, the six degrees of freedom motion errors are rarely evaluated.

The present invention is an apparatus for simultaneously measuring six degrees of freedom and providing an efficient, accurate and inexpensive method for evaluating machine tool errors measuring six motion errors of precision machines and robots. The six degrees of freedom metrology measures three translational errors, three angular errors and three squareness errors. All of the measurements are performed at the same time independent of setup accuracy.

In one embodiment the present invention provides an apparatus for use in calibrating relative motions of moveable parts comprising a plurality of balls and rods, and a plurality of liner encoders which form configurations to measure multiple translational, angular and squareness errors simultaneously.

In another embodiment the present invention provides an apparatus for use in calibrating relative movements of parts of a machine comprising a plurality of balls, a plurality of rods, linear encoders, a top platform, and a bottom platform. The balls and rods form ballbars which may be used to bridge or extend between the top platform and the bottom platform. The top platform may be contacted to a moveable part on a tool or robot. The bottom platform may be attached to a fixed point on a tool or robot. The ballbars form configurations which measure multiple translational, angular and squareness errors simultaneously. A ball bar consists of a telescopic rod having a ball at each end, and which can be positioned between a socket or pivot carried by a part on a robot or a machine, and a socket mounted on the machine table or in fixed position relative to the machine or robot. The measurements are made of any change in length or movement of the ball bar by means of a displacement sensor such as a liner encoder connected to the rod.

The apparatus of the present invention has two platforms, a top platform and a bottom platform. The apparatus of the present invention can be placed between members to be measured. The bottom platform of the apparatus can be mounted on one part of a tool or machine, for example on a moving slide of a machine tool, and the top platform of the apparatus can be mounted on another part of a tool or machine, for example, the tool holder of the machine tool. In a preferred embodiment, the bottom platform of the apparatus is thermally stable and includes a magnetic base.

Figure 2:
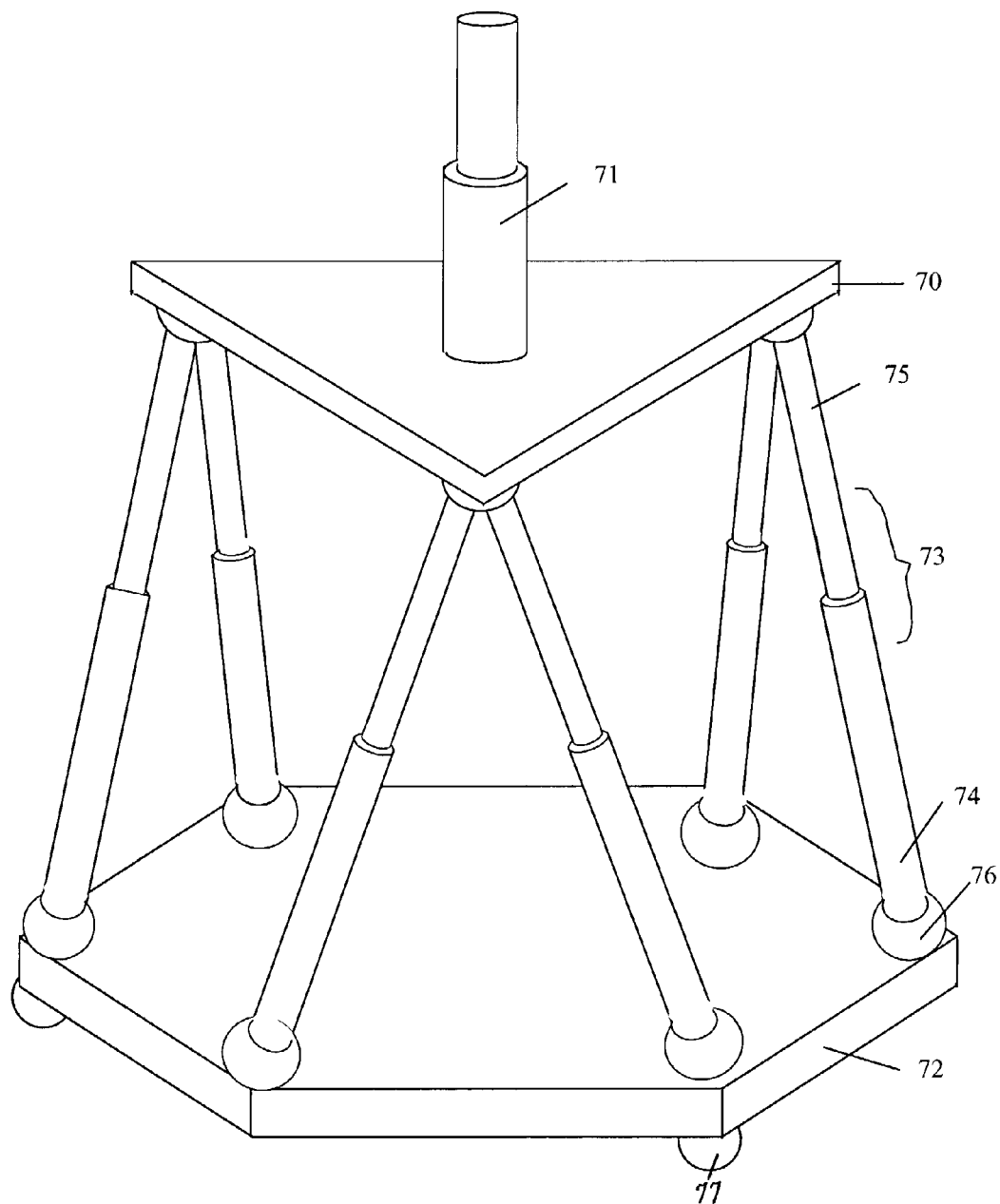
FIG. 2 is a schematic diagram of a measuring apparatus for precision calibration of a machine.
Figure 3:
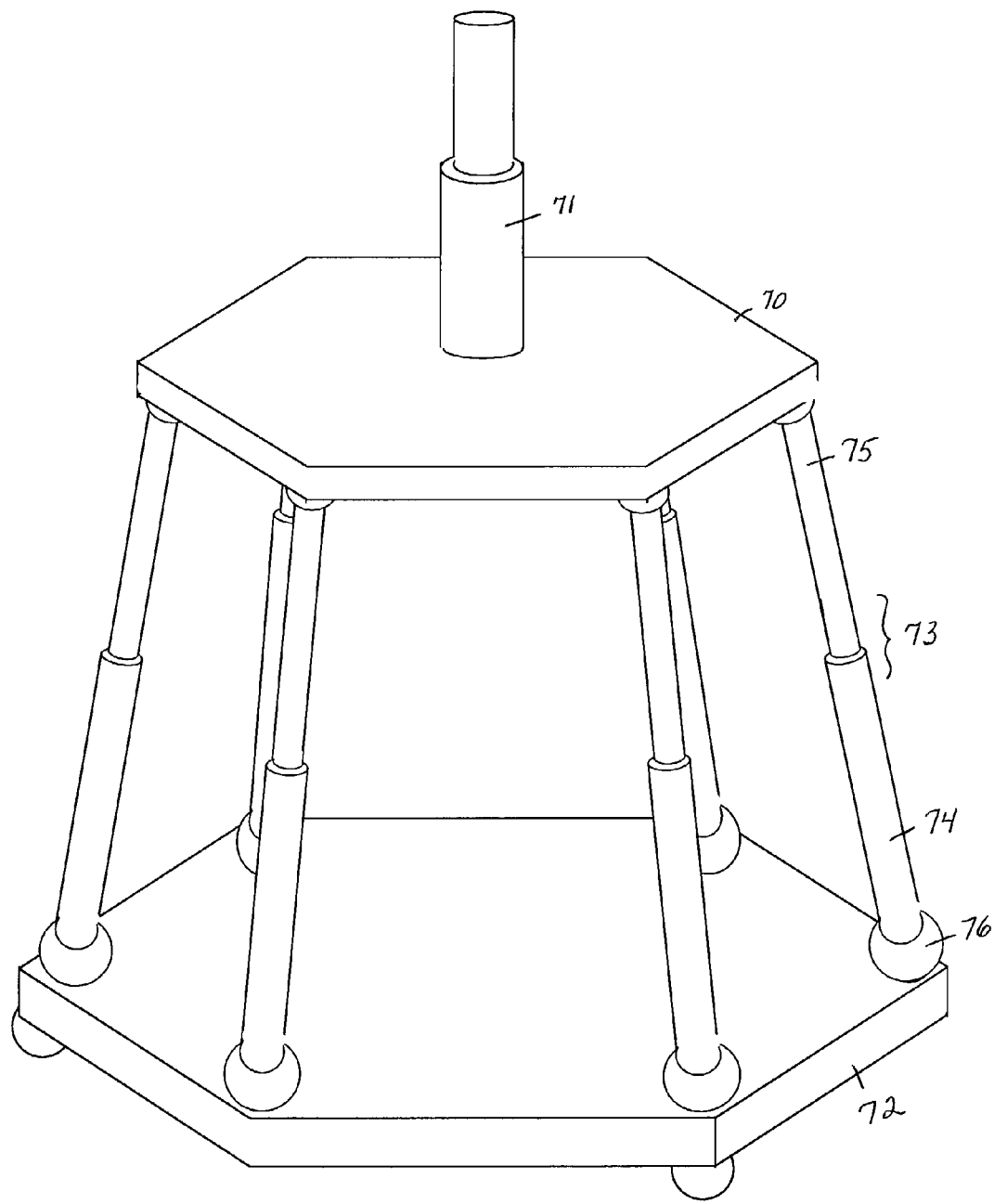
FIG. 3 is a schematic diagram of a measuring apparatus for precision calibration of a machine.
Figure 4:
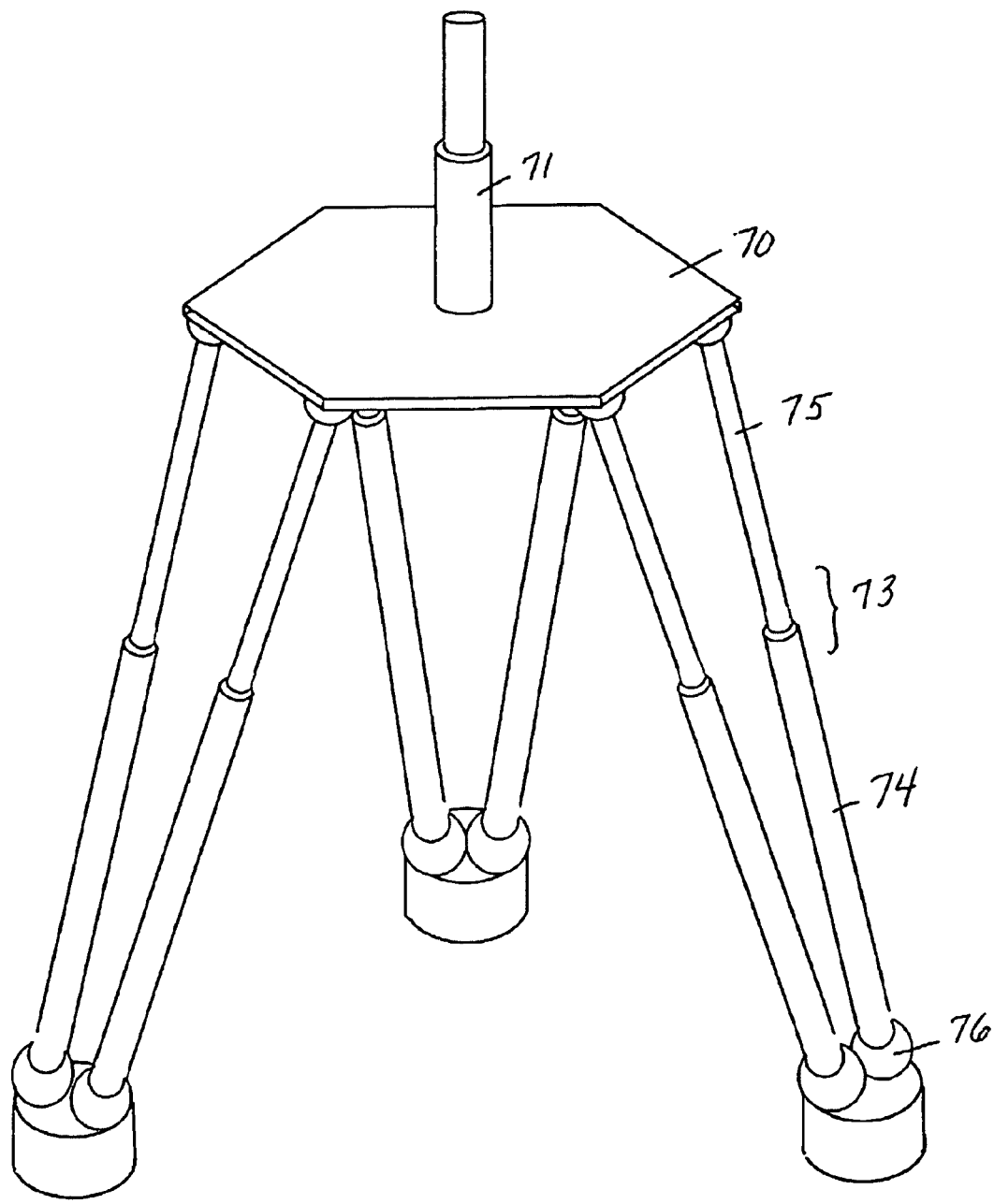
FIG. 4 is a schematic diagram of a measuring apparatus for precision calibration of a machine.

Each end of each telescopic rod is connected to each platform using magnetic attraction. A ball is used in the magnetic connection to allow motions around the ball surface and keep the platform and bar stay in contact at all times. There may be varying numbers of balls, for example as many as six balls may be contacted to the top platform and six balls may be contacted the bottom platform as shown in FIGS. 3 and 4. Further, there may be as few as three balls connected to the top platform and three balls connected to the bottom platform if two ends share one ball in the connection, as shown in FIG. 1. Another example is shown in FIG. 2 where three balls are used to connect to the top platform and six balls are used to connect to the bottom platform.

Multiple tubes, for example, at least two tubes are needed to form one telescopic rod, in order to allow the length change of telescopic rod. A displacement sensor, preferably mounted inside a telescopic ballbar, consists of a scale attached to one tube and a sensor head mounted to the other tube. When the length of the telescopic rod changes caused by the relative motion of the two tubes involved in measurement, the relative motion between the scale and the sensor head is thus sensed by the head. A plurality of telescopic rods are used in the apparatus of the present invention and each telescopic rod has a displacement sensor in it. Each displacement sensor senses changes of the length of each telescopic rod. A linear encoder is one example of a type of displacement sensor that be used in a telescopic rod.

The displacement signal from each displacement sensor may be acquired using a multi-channel data acquisition system including a data acquisition card and software installed in a notebook or desktop PC. The transmitting of the signals from all of the displacement sensors to the data acquisition card can be realized using cables or wireless transmitters and receivers. The wireless method is convenient for use in a shop floor environment. The data acquired through the data acquisition card is processed using the mathematic model in the format of software or computer aided program. The outputs of the data processing are relative motion errors between the two objects including three translational errors, three angular errors and three squareness errors. Both graphics and numerical results may be obtained through the use of a personal computer or other suitable computer.

In one embodiment the present invention provides an apparatus for calibrating all six degrees of freedom, including three angular errors, three translational errors and three squareness errors separately and simultaneously. In a preferred embodiment the apparatus uses a bottom platform including a magnetic base for use as a mounting device to support a six degree of freedom measuring apparatus. The hexballbar embodiment is made up of six telescopic bars and six balls, and two platforms, as shown in FIG. 1. Each rod performs rotational movement about the center of a ball during measurement or calibration of relative movements of parts of a machine or robot. The hexballbar apparatus includes a top platform for mounting the hexballbar apparatus on one of the machine parts and the center of each ball connects the ends of two telescopic ballbars together.

The apparatus of the present invention is useful for precision calibration of a machine having a table or base with a moveable tool and means for producing movements there between. The apparatus comprises a top platform of the apparatus for mounting on the machine table or tool holder of a machine tool a plurality of balls and a plurality of rods form ball bars which ballbars extend between the top and bottom mounting platforms. A plurality of linear encoders measure the machine motion and relay electronic signals used in a computer software program to identify motion errors. At least two tubes are needed to form one telescopic ballbar to allow the length change of telescopic ballbar. An encoder, preferably mounted inside a telescopic ballbar, consists of a scale attached to one tube and a sensor head mounted to the other tube. When the length of the telescopic ballbar changes caused by the relative motion of the two objects involved in measurement, the relative motion between the scale and the sensor head is thus sensed by the head. The top platform may consist of individual balls or it may be an independent component. If the top platform is an independent component, one or more of the balls is attached or contacted to the top platform, preferably by magnets. A bottom platform of the apparatus for mounting on the moveable portion of a machine is contacted to the machine preferably via a magnetic contact. The bottom platform may be an independent apparatus or it may be composed of individual magnetic balls or balls contacted to a machine via magnets.

FIG. 1 shows one configuration of the present invention using six balls and six telescopic bars which form ball bars and extend between the top and bottom mounting platforms, and six linear encoders.

As shown in FIG. 1, the measuring apparatus is arranged in a configuration such that a tool arm or other moveable part of a tool or robot may be contacted to the top platform, and a machine or other structure may be contacted to a bottom platform. The top platform is magnetically connected to the bottom platform via multiple telescopic rods 73 and balls 76. The telescopic rod comprises a wide diameter end 74 and a smaller diameter end 75. The wide diameter end 74 is contacted to the bottom platform via a ball 76 which is magnetically connected to the bottom platform and the telescopic rod. The top platform may be comprised of a plate or of multiple non-telescopic rods 12 contacted to individual balls 76 which are rotatably mounted to telescopic rods 73. In a preferred embodiment, each individual ball 76 is contacted to at least two telescopic rods 73 by means of a magnetic connection. The telescopic rods 73 comprise support means for supporting the balls 76. Each ball is connected to at least two other balls 76 via telescopic rods 73. The bottom platform may be comprised of a plate or of multiple non-telescopic rods 12 contacted to individual balls 76 which are rotatably mounted to telescopic rods 73. Displacement sensors located inside the telescopic rods detect placement and positioning of the rods.

FIG. 2 shows another configuration of the present invention using six telescopic rods arranged in pairs. The telescopic rods 73 contact the top platform with the bottom platform via balls 76, in a preferred embodiment the balls are magnetic. The bottom platform may be connected to the moveable portion of a machine via magnets, preferably three magnets are utilized to connect the bottom platform to the machine.

The measuring apparatus may be arranged in a configuration such that a tool holder or other moveable part of a tool or robot may be contacted to the upper side of the top platform 70 via a means for connection 71. The top platform 70 may be contacted to the upper side of the bottom platform 72 by telescopic rods 73 each comprising a wide diameter end 74 and a smaller diameter end 75. The telescopic rods 73 connect the top platform 70 to the bottom platform 72. The top platform 70 has a upper and under side and three edges. The bottom platform 72 has an upper and under side and multiple edges. In a preferred embodiment, the telescopic rods 73 are arranged in three pairs so that for each pair the two smaller diameter ends 75 are rotatably mounted to a ball 76 contacted to the under side of the top platform 70. For each pair of telescopic rods 73 the wide diameter end of the telescopic rods 74 are contacted to balls which are further contacted to the upper side of the bottom platform 72, the connection to the upper side of the bottom platform is preferably magnetic. The under side of the bottom platform 72 is connected to a plurality of magnetic balls 77, preferably at least three which secure the apparatus to the machine.

As shown in FIG. 3, the measuring apparatus may be arranged in a configuration such that a top platform 70 with an upper and an under side and six edges and six corners and a bottom platform 72 has a upper and under side and six edges are connected via balls 76 contacted to telescopic rods 73. The measuring apparatus of the present invention uses six telescopic rods 73 and twelve balls 76 arranged individually to connect the top platform with the bottom platform via magnetic connections. The bottom platform may be connected to the moveable portion of a machine via magnets, preferably at least three magnets are utilized to contact the underside of the bottom platform to the machine. A tool arm or other moveable part of a tool or robot may be contacted via a connector 71 to the upper side of a hexagonal shaped top platform 70. The telescopic rods 73 each comprise a wide diameter end 74 and a smaller diameter end 75. The wide diameter end 74 and the smaller diameter end 75 of each rod is magnetically attached to a ball. The ball on the small diameter end 75 is attached to the under side of the top platform 70. The ball on the wide diameter end is attached to the upper side of the bottom platform 72. The telescopic rods 73 connect the corners of the under side of the top platform 70 to the corners of the upper side of the bottom platform 72 together. The under side of the bottom platform 72 is magnetically contacted to multiple balls which may be contacted to machinery for attachment.

FIG. 4 shows another configuration of the present invention using six telescopic rods 73 and twelve balls 76 arranged individually to connect the top platform 70 with the bottom platform 72. The balls 76 are magnetically connected to both the top platform 70 and to the smaller diameter end 75 of the telescopic rods 73 via a magnetic connection. The bottom platform may be formed using three non-telescopic bars or rods magnetically connected by corner connectors. Each corner connector is further connected to two telescopic rods 73. The corner connectors may be of any shape. The corner connectors may be used to attach the measuring apparatus to a machine. The magnetic connections of the apparatus may be in the form of a magnetically charged telescopic rod, a magnetically charged ball or a magnetically charged support structure in the base platform. A triangular-shaped bottom platform is well suited for easy setup and disassembly, and it may also be stored in a compact form. It is preferred that the materials used on the measuring apparatus of FIG. 4 be thermally stable so that the dimensions are non-varying even as the environmental temperature varies.

In a preferred embodiment, the measuring apparatus is formed from telescopic rods of the same design and balls of the same size. The materials of the telescopic rods, are preferably lightweight and provide low thermal expansion along the axial direction, such as carbon fiber composite tubes or other suitable materials. The balls are preferably precision steel balls. In a preferred embodiment, a standard magnetic base may be utilized which holds the measuring apparatus in place on a machine bed. Signal processing electronics may be utilized which allow the measurement data to be collected for six degrees of freedom via a data acquisition system as described above, and processed using a software program based upon mathematical equations or formulas such as shown in Example 1 to decouple motion errors and generate error view graphs. The software can be executed on a standard computer. The mathematical program allows for rapid and inexpensive generation of data used for positional adjustments of the machine so that precision measurements able to be carried out for six degrees of freedom.

The present invention further provides a method of calibrating relative motions of moveable parts comprising contacting the moveable part to the precision measuring apparatus so that the linear encoders are able to relay data which measures translational angular and squareness errors, and calibrating the moveable part based upon the data collected. The apparatus can be placed between members to be measured. In a preferred embodiment, the bottom platform of the apparatus can be mounted on one part of a tool or machine, for example on a moving slide of a machine tool, and the top platform of the apparatus can be mounted on another part of a tool or machine, for example, the tool holder of the machine tool. Preferably, the bottom platform of the apparatus is thermally stable and includes a magnetic base.

In one aspect, the present invention provides a method of calibrating relative motions of moveable parts wherein the top platform and the bottom platform attach to two mechanical objects with relative motions, so that the motions may be measured for calibration. Attachment of the top and bottom platforms to the two objects should not introduce motions errors. In one preferred method, a kinematic three-point support, is used to attach the bottom platform to one of the objects such as a machine tool slide. The three-point support uses magnetic attraction to attach to the machine. Three balls can be used in the magnetic connection to increase the accuracy of the connection. The top platform may be connected to another object through a connector, such as a cylindrical boss or other suitable connector.

The present invention further provides a method of calibrating a machine tool for translational, angular and squareness errors comprising mounting the precision measuring apparatus between members to be measured wherein the bottom platform of the apparatus is mounted on the machine tool and the top platform of the apparatus is mounted on a fixed position of the machine tool, after the precision measuring apparatus is mounted the machine tool is programmed to move and the apparatus measures the motion of tool for translational, angular and squareness errors.

The present invention also provides a method of calibrating relative motions of moveable parts comprising contacting the moveable parts of two machines to the top and bottom platform of the measuring apparatus of the present invention so that the movement of the machines causes movement of the telescopic rods. The movement of the telescopic rods is measured by the displacement sensors in the telescopic rods which relay data measurements relating to translational, angular and squareness errors to a computer so that the moveable parts of the machines may be calibrated based upon the data collected.

EXAMPLE 1

Mathematic Modeling of the 6-DOF Ball Bar Measuring Device

From 6 equations below:

$$f_1 = f_1(x, y, z, \alpha, \beta, \gamma, g) = 0$$

$$f_2 = f_2(x, y, z, \alpha, \beta, \gamma, g) = 0$$

$$\ldots$$

$$f_6 = f_6(x, y, z, \alpha, \beta, \gamma, g) = 0$$

Taking differentials to all variables x, y, z, $\alpha$, $\beta$, $\gamma$ and g, where g is a vector including all geometric parameters.

$df_1 = 0$ means:

$$\frac{\partial f_i}{\partial x} \cdot dx + \frac{\partial f_i}{\partial y} \cdot dy + \frac{\partial f_i}{\partial z} \cdot dz + \frac{\partial f_i}{\partial \alpha} \cdot d\alpha + \frac{\partial f_i}{\partial \beta} \cdot d\beta + \frac{\partial f_i}{\partial \gamma} \cdot d\gamma + \sum_j \frac{\partial f_i}{\partial g_j} \cdot dg_j = 0 \quad (1)$$

rewriting it in Matrix form $$\begin{bmatrix} \frac{\partial f_1}{\partial x} & \frac{\partial f_1}{\partial y} & \frac{\partial f_1}{\partial z} & \frac{\partial f_1}{\partial \alpha} & \frac{\partial f_1}{\partial \beta} & \frac{\partial f_1}{\partial \gamma} \\ \frac{\partial f_2}{\partial x} & \frac{\partial f_2}{\partial y} & \frac{\partial f_2}{\partial z} & \frac{\partial f_2}{\partial \alpha} & \frac{\partial f_2}{\partial \beta} & \frac{\partial f_2}{\partial \gamma} \\ \frac{\partial f_3}{\partial x} & \frac{\partial f_3}{\partial y} & \frac{\partial f_3}{\partial z} & \frac{\partial f_3}{\partial \alpha} & \frac{\partial f_3}{\partial \beta} & \frac{\partial f_3}{\partial \gamma} \\ \frac{\partial f_4}{\partial x} & \frac{\partial f_4}{\partial y} & \frac{\partial f_4}{\partial z} & \frac{\partial f_4}{\partial \alpha} & \frac{\partial f_4}{\partial \beta} & \frac{\partial f_4}{\partial \gamma} \\ \frac{\partial f_5}{\partial x} & \frac{\partial f_5}{\partial y} & \frac{\partial f_5}{\partial z} & \frac{\partial f_5}{\partial \alpha} & \frac{\partial f_5}{\partial \beta} & \frac{\partial f_5}{\partial \gamma} \\ \frac{\partial f_6}{\partial x} & \frac{\partial f_6}{\partial y} & \frac{\partial f_6}{\partial z} & \frac{\partial f_6}{\partial \alpha} & \frac{\partial f_6}{\partial \beta} & \frac{\partial f_6}{\partial \gamma} \end{bmatrix} \cdot \begin{bmatrix} dx \\ dy \\ dz \\ d\alpha \\ d\beta \\ d\gamma \end{bmatrix} = \begin{bmatrix} \sum_j \frac{-\partial f_1}{\partial g_j} dg_j \\ \sum_j \frac{-\partial f_2}{\partial g_j} dg_j \\ \sum_j \frac{-\partial f_3}{\partial g_j} dg_j \\ \sum_j \frac{-\partial f_4}{\partial g_j} dg_j \\ \sum_j \frac{-\partial f_5}{\partial g_j} dg_j \\ \sum_j \frac{-\partial f_6}{\partial g_j} dg_j \end{bmatrix} \quad (2)$$

that is $$J_1 dX = dG \quad (3)$$

Where $$dG = \begin{bmatrix} \sum_j \frac{-\partial f_1}{\partial g_j} dg_j \\ \sum_j \frac{-\partial f_2}{\partial g_j} dg_j \\ \sum_j \frac{-\partial f_3}{\partial g_j} dg_j \\ \sum_j \frac{-\partial f_4}{\partial g_j} dg_j \\ \sum_j \frac{-\partial f_5}{\partial g_j} dg_j \\ \sum_j \frac{-\partial f_6}{\partial g_j} dg_j \end{bmatrix} = -\begin{bmatrix} \frac{\partial f_1}{\partial g_1} & \frac{\partial f_1}{\partial g_1} & \cdots & \frac{\partial f_1}{\partial g_N} \\ \cdots & \cdots & \cdots & \cdots \\ \cdots & \cdots & \cdots & \cdots \\ \frac{\partial f_6}{\partial g_1} & \frac{\partial f_6}{\partial g_2} & \cdots & \frac{\partial f_6}{\partial g_N} \end{bmatrix}_{6 \times N} \cdot \begin{bmatrix} dg_1 \\ dg_2 \\ \vdots \\ dg_N \end{bmatrix}_{N \times 1} \quad (4)$$

from Eq. (4) above $$dG = J_2 dg \quad (5)$$

then substitute the Eq. (3) into Eq. (5) one can get $$J_1 dX = J_2 dL \quad (6)$$

that is $$dX = (J_1^{-1} J_2) dL \quad (7)$$

So Jacobian Matrix is $J_1^{-1} \cdot J_2$ $$J = \quad (8)$$

$$J_1^{-1} \cdot J_2 = \begin{bmatrix} \frac{\partial f_1}{\partial x} & \frac{\partial f_1}{\partial y} & \frac{\partial f_1}{\partial z} & \frac{\partial f_1}{\partial \alpha} & \frac{\partial f_1}{\partial \beta} & \frac{\partial f_1}{\partial \gamma} \\ \frac{\partial f_2}{\partial x} & \frac{\partial f_2}{\partial y} & \frac{\partial f_2}{\partial z} & \frac{\partial f_2}{\partial \alpha} & \frac{\partial f_2}{\partial \beta} & \frac{\partial f_2}{\partial \gamma} \\ \frac{\partial f_3}{\partial x} & \frac{\partial f_3}{\partial y} & \frac{\partial f_3}{\partial z} & \frac{\partial f_3}{\partial \alpha} & \frac{\partial f_3}{\partial \beta} & \frac{\partial f_3}{\partial \gamma} \\ \frac{\partial f_4}{\partial x} & \frac{\partial f_4}{\partial y} & \frac{\partial f_4}{\partial z} & \frac{\partial f_4}{\partial \alpha} & \frac{\partial f_4}{\partial \beta} & \frac{\partial f_4}{\partial \gamma} \\ \frac{\partial f_5}{\partial x} & \frac{\partial f_5}{\partial y} & \frac{\partial f_5}{\partial z} & \frac{\partial f_5}{\partial \alpha} & \frac{\partial f_5}{\partial \beta} & \frac{\partial f_5}{\partial \gamma} \\ \frac{\partial f_6}{\partial x} & \frac{\partial f_6}{\partial y} & \frac{\partial f_6}{\partial z} & \frac{\partial f_6}{\partial \alpha} & \frac{\partial f_6}{\partial \beta} & \frac{\partial f_6}{\partial \gamma} \end{bmatrix}^{-1} \cdot \begin{bmatrix} -\frac{\partial f_1}{\partial l_1} & -\frac{\partial f_1}{\partial l_2} & \cdots & -\frac{\partial f_1}{\partial l_N} \\ \cdots & \cdots & \cdots & \cdots \\ \cdots & \cdots & \cdots & \cdots \\ \cdots & \cdots & \cdots & \cdots \\ -\frac{\partial f_6}{\partial l_1} & -\frac{\partial f_6}{\partial l_2} & \cdots & -\frac{\partial f_6}{\partial l_N} \end{bmatrix}$$

Newton Raphson method:

$$X_{n+1} = X_n - [F'(X_n)]^{-1} \cdot F(X_n)$$

$$f_1 = f_1(x, y, z, \alpha, \beta, \gamma, g) = 0$$

$$f_2 = f_2(x, y, z, \alpha, \beta, \gamma, g) = 0$$

$$\ldots$$

$$f_6 = f_6(x, y, z, \alpha, \beta, \gamma, g) = 0$$

-continued $$[F'(X_n)]^{-1} = Inv \begin{bmatrix} \frac{\partial f_1}{\partial x} & \frac{\partial f_1}{\partial y} & \frac{\partial f_1}{\partial z} & \frac{\partial f_1}{\partial \alpha} & \frac{\partial f_1}{\partial \beta} & \frac{\partial f_1}{\partial \gamma} \\ \frac{\partial f_2}{\partial x} & \frac{\partial f_2}{\partial y} & \frac{\partial f_2}{\partial z} & \frac{\partial f_2}{\partial \alpha} & \frac{\partial f_2}{\partial \beta} & \frac{\partial f_2}{\partial \gamma} \\ \frac{\partial f_3}{\partial x} & \frac{\partial f_3}{\partial y} & \frac{\partial f_3}{\partial z} & \frac{\partial f_3}{\partial \alpha} & \frac{\partial f_3}{\partial \beta} & \frac{\partial f_3}{\partial \gamma} \\ \frac{\partial f_4}{\partial x} & \frac{\partial f_4}{\partial y} & \frac{\partial f_4}{\partial z} & \frac{\partial f_4}{\partial \alpha} & \frac{\partial f_4}{\partial \beta} & \frac{\partial f_4}{\partial \gamma} \\ \frac{\partial f_5}{\partial x} & \frac{\partial f_5}{\partial y} & \frac{\partial f_5}{\partial z} & \frac{\partial f_5}{\partial \alpha} & \frac{\partial f_5}{\partial \beta} & \frac{\partial f_5}{\partial \gamma} \\ \frac{\partial f_6}{\partial x} & \frac{\partial f_6}{\partial y} & \frac{\partial f_6}{\partial z} & \frac{\partial f_6}{\partial \alpha} & \frac{\partial f_6}{\partial \beta} & \frac{\partial f_6}{\partial \gamma} \end{bmatrix}$$

For $F(X_n)$, a analytical solution can be obtained by using the Symbolic tool box of Matlab software.

Index of $F(X_n)$:

$(1,1) = -2*xb1 + 2*\cos(afa)*\cos(bta)*xtl1 + 2*(\cos(afa)*\sin(bta)*\sin(gma) - \sin(afa)*\cos(gma))*ytl1 + 2*(\cos(afa)*\sin(bta)*\cos(gma) + \sin(afa)*\sin(gma))*ztl1 + 2*x + 2*t0x$ $(1,2) = -2*yb1 + 2*\sin(afa)*\cos(bta)*xtl1 + 2*(\sin(afa)*\sin(bta)*\sin(gma) + \cos(afa)*\cos(gma))*ytl1 + 2*(\sin(afa)*\sin(bta)*\cos(gma) - \cos(afa)*\sin(gma))*ztl1 + 2*y + 2*t0y$ $(1,3) = -2*zb1 - 2*\sin(bta)*xtl1 + 2*\cos(bta)*\sin(gma)*ytl1 + 2*\cos(bta)*\cos(gma)*ztl1 + 2*z + 2*t0z$ $(1,4) = 2*(xb1 - \cos(afa)*\cos(bta)*xtl1 - (\cos(afa)*\sin(bta)*\sin(gma) - \sin(afa)*\cos(gma))*ytl1 - (\cos(afa)*\sin(bta)*\cos(gma) + \sin(afa)*\sin(gma))*ztl1 - x - t0x)*(\sin(afa)*\cos(bta)*xtl1 - (-\sin(afa)*\sin(bta)*\sin(gma) - \cos(afa)*\cos(gma))*ytl1 - (-\sin(afa)*\sin(bta)*\cos(gma) + \cos(afa)*\sin(gma))*ztl1) + 2*(yb1 - \sin(afa)*\cos(bta)*xtl1 - (\sin(afa)*\sin(bta)*\sin(gma) + \cos(afa)*\cos(gma))*ytl1 - (\sin(afa)*\sin(bta)*\cos(gma) - \cos(afa)*\sin(gma))*ztl1 - y - t0y)*(-\cos(afa)*\cos(bta)*xtl1 - (\cos(afa)*\sin(bta)*\sin(gma) - \sin(afa)*\cos(gma))*ytl1 - (\cos(afa)*\sin(bta)*\cos(gma) + \sin(afa)*\sin(gma))*ztl1)$ $(1,5) = 2*(xb1 - \cos(afa)*\cos(bta)*xtl1 - (\cos(afa)*\sin(bta)*\sin(gma) - \sin(afa)*\cos(gma))*ytl1 - (\cos(afa)*\sin(bta)*\cos(gma) + \sin(afa)*\sin(gma))*ztl1 - x - t0x)*(\cos(afa)*\sin(bta)*xtl1 - \cos(afa)*\cos(bta)*\sin(gma)*ytl1 - \cos(afa)*\cos(bta)*\cos(gma)*ztl1) + 2*(yb1 - \sin(afa)*\cos(bta)*xtl1 - (\sin(afa)*\sin(bta)*\sin(gma) + \cos(afa)*\cos(gma))*ytl1 - (\sin(afa)*\sin(bta)*\cos(gma) - \cos(afa)*\sin(gma))*ztl1 - y - t0y)*(\sin(afa)*\sin(bta)*xtl1 - \sin(afa)*\cos(bta)*\sin((gma))*ytl1 - \sin(afa)*\cos(bta)*\cos(gma)*ztl1) + 2*(zb1 + \sin(bta)*xtl1 - \cos(bta)*\sin(gma)*ytl1 - \cos(bta)*\cos(gma)*ztl1 - z - t0z)*(\cos(bta)*xtl1 + \sin(bta)*\sin(gma)*ytl1 + \sin(bta)*\cos(gma)*ztl1)$ $(1,6) = 2*(xb1 - \cos(afa)*\cos(bta)*xtl1 - (\cos(afa)*\sin(bta)*\sin(gma) - \sin(afa)*\cos(gma))*ytl1 - (\cos(afa)*\sin(bta)*\cos(gma) + \sin(afa)*\sin(gma))*ztl1 - x - t0x)*(-(\cos(afa)*\sin(bta)*\cos(gma) + \sin(afa)*\sin(gma))*ytl1 - (-\cos(afa)*\sin(bta)*\sin(gma) + \sin(afa)*\cos(gma))*ztl1) + 2*(yb1 - \sin(afa)*\cos(bta)*xtl1 - (\sin(afa)*\sin(bta)*\sin(gma) + \cos(afa)*\cos(gma))*ytl1 - (\sin(afa)*\sin(bta)*\cos(gma) - \cos(afa)*\sin(gma))*ztl1 - y - t0y)*(-(\sin(afa)*\sin(bta)*\cos(gma) - \cos(afa)*\sin(gma))*ytl1 - (-\sin(afa)*\sin(bta)*\sin(gma) - \cos(afa)*\cos(gma))*ztl1) + 2*(zb1 + \sin(bta)*xtl1 - \cos(bta)*\sin(gma)*ytl1 - \cos(bta)*\cos(gma)*ztl1 - z - t0z)*(-\cos(bta)*\cos(gma)*ytl1 + \cos(bta)*\sin(gma)*ztl1)$ $(2,1) = -2*xb2 + 2*\cos(afa)*\cos(bta)*xtl2 + 2*(\cos(afa)*\sin(bta)*\sin(gma) - \sin(afa)*\cos(gma))*ytl2 + 2*(\cos(afa)*\sin(bta)*\cos(gma) + \sin(afa)*\sin(gma))*ztl2 + 2*x + 2*t0x$ $(2,2) = -2*yb2 + 2*\sin(afa)*\cos((bta)*xtl2 + 2*(\sin(afa)*\sin(bta)*\sin(gma) + \cos(afa)*\cos(gma))*ytl2 + 2*(\sin(afa)*\sin(bta)*\cos(gma) - \cos(afa)*\sin(gma))*ztl2 + 2*y + 2*t0y$ $(2,3) = -2*zb2 - 2*\sin(bta)*xtl2 + 2*\cos(bta)*\sin(gma)*ytl2 + 2*\cos(bta)*\cos(gma)*ztl2 + 2*z + 2*t0z$ $(2,4) = 2*(xb2 - \cos(afa)*\cos(bta)*xtl2 - (\cos(afa)*\sin(bta)*\sin(gma) - \sin(afa)*\cos(gma))*ytl2 - (\cos(afa)*\sin(bta)*\cos(gma) + \sin(afa)*\sin(gma))*ztl2 - x - t0x)*(\sin(afa)*\cos(bta)*xtl2 - (-\sin(afa)*\sin(bta)*\sin(gma) - \cos(afa)*\cos(gma))*ytl2 - (-\sin(afa)*\sin(bta)*\cos(gma) + \cos(afa)*\sin(gma))*ytl2 - y - t0y)*(-\cos(afa)*\cos(bta)*xtl2 - (\cos(afa)*\sin(bta)*\sin(gma) - \sin(afa)*\cos(gma))*ytl2 - (\cos(afa)*\sin(bta)*\cos(gma) + \sin(afa)*\sin(gma))*ztl2)$ $(2,5) = 2*(xb2 - \cos(afa)*\cos(bta)*xtl2 - (\cos(afa)*\sin(bta)*\sin(gma) - \sin(afa)*\cos(gma))*ytl2 - (\cos(afa)*\sin(bta)*\cos(gma) + \sin(afa)*\sin(gma))*ztl2 - x - t0x)*(\cos(afa)*\sin(bta)*xtl2 - \cos(afa)*\cos(bta)*\sin(gma)*ytl2 - \cos(afa)*\cos(bta)*\cos(gma)*ztl2) + 2*(yb2 - \sin(afa)*\cos(bta)*xtl2 - (\sin(afa)*\sin(bta)*\sin(gma) + \cos(afa)*\cos(gma))*ytl2 - (\sin(afa)*\sin(bta)*\cos(gma) - \cos(afa)*\sin(gma))*ztl2 - y - t0y)*(\sin(afa)*\sin(bta)*xtl2 - \sin(afa)*\cos(bta)*\sin(gma)*ytl2 - \sin(afa)*\cos(bta)*\cos(gma)*ztl2) + 2*(zb2 + \sin(bta)*xtl2 - \cos(bta)*\sin(gma)*ytl2 - \cos(bta)*\cos(gma)*ztl2 - z - t0z)*(\cos(bta)*xtl2 + \sin(bta)*\sin(gma)*ytl2 + \sin(bta)*\cos(gma)*ztl2)$ $(2,6) = 2*(xb2 - \cos(afa)*\cos(bta)*xtl2 - (\cos(afa)*\sin(bta)*\sin(gma) - \sin(afa)*\cos(gma))*ytl2 - (\cos(afa)*\sin(bta)*\cos(gma) + \sin(afa)*\sin(gma))*ztl2 - x - t0x)*(-(\cos(afa)*\sin(bta)*\cos(gma) + \sin(afa)*\sin(gma))*ytl2 - (-\cos(afa)*\sin(bta)*\sin(gma) + \sin(afa)*\cos(gma))*ztl2) + 2*(yb2 - \sin(afa)*\cos(bta)*xtl2 - (\sin(afa)*\sin(bta)*\sin(gma) + \cos(afa)*\cos(gma))*ytl2 - (\sin(afa)*\sin(bta)*\cos(gma) - \cos(afa)*\sin(gma))*ztl2 - y - t0y)*(-(\sin(afa)*\sin(bta)*\cos(gma) - \cos(afa)*\sin(gma))*ytl2 - (-\sin(afa)*\sin(bta)*\sin(gma) - \cos(afa)*\cos(gma))*ztl2) + 2*(zb2 + \sin(bta)*xtl2 - \cos(bta)*\sin(gma)*ytl2 - \cos(bta)*\cos(gma)*ztl2 - z - t0z)*(-\cos(bta)*\cos(gma)*ytl2 + \cos(bta)*\sin(gma)*ztl2)$ $(3,1) = -2*xb3 + 2*\cos(afa)*\cos(bta)*xtl3 + 2*(\cos(afa)*\sin(bta)*\sin(gma) - \sin(afa)*\cos(gma))*ytl3 + 2*(\cos(afa)*\sin(bta)*\cos(gma) + \sin(afa)*\sin(gma))*ztl3 + 2*x + 2*t0x$ $(3,2) = -2*yb3 + 2*\sin(afa)*\cos(bta)*xtl3 + 2*(\sin(afa)*\sin(bta)*\sin(gma) + \cos(afa)*\cos(gma))*ytl3 + 2*(\sin(afa)*\sin(bta)*\cos(gma) - \cos(afa)*\sin(gma))*ztl3 + 2*y + 2*t0y$ $(3,3) = -2*zb3 - 2*\sin(bta)*xtl3 + 2*\cos(bta)*\sin(gma)*ytl3 + 2*\cos(bta)*\cos(gma)*ztl3 + 2*z + 2*t0z$ $(3,4) = 2*(xb3 - \cos(afa)*\cos(bta)*xtl3 - (\cos(afa)*\sin(bta)*\sin(gma) - \sin(afa)*\cos(gma))*ytl3 - (\cos(afa)*\sin(bta)*\cos(gma) + \sin(afa)*\sin(gma))*ztl3 - x - t0x)*(\sin(afa)*\cos(bta)*xtl3 - (-\sin(afa)*\sin(bta)*\sin(gma) - \cos(afa)*\cos(gma))*ytl3 - (-\sin(afa)*\sin(bta)*\cos(gma) + \cos(afa)*\sin(gma))*ztl3) + 2*(yb3 - \sin(afa)*\cos(bta)*xtl3 - (\sin(afa)*\sin(bta)*\sin(gma) + \cos(afa)*\cos(gma))*ytl3 - (\sin(afa)*\sin(bta)*\cos(gma) - \cos(afa)*\sin(gma))*ztl3 - y - t0y)*(-\cos(afa)*\cos(bta)*xtl3 - (\cos(afa)*\sin(bta)*\sin(gma) - \sin(afa)*\cos(gma))*ytl3 - (\cos(afa)*\sin(bta)*\cos(gma) + \sin(afa)*\sin(gma))*ztl3)$ $(3,5) = 2*(xb3 - \cos(afa)*\cos(bta)*xtl3 - (\cos(afa)*\sin(bta)*\sin(gma) - \sin(afa)*\cos(gma))*ytl3 - (\cos(afa)*\sin(bta)*\cos(gma) + \sin(afa)*\sin(gma))*ztl3 - x - t0x)*(\cos(afa)*\sin(bta)*xtl3 - \cos(afa)*\cos(bta)*\sin(gma)*ytl3 - \cos(afa)*\cos(bta)*\cos(gma)*ztl3) + 2*(yb3 - \sin(afa)*\cos(bta)*xtl3 - (\sin(afa)*\sin(bta)*\sin(gma) + \cos(afa)*\cos(gma))*ytl3 - (\sin(afa)*\sin(bta)*\cos(gma) - \cos(afa)*\sin(gma))*ztl3 - y - t0y)*(\sin(afa)*\sin(bta)*xtl3 - \sin(afa)*\cos(bta)*\sin(gma)*ytl3 - \sin(afa)*\cos(bta)*\cos(gma)*ztl3) + 2*(zb3 + \sin(bta)*xtl3 - \cos(bta)*\sin(gma)*ytl3 - \cos(bta)*\cos(gma)*ztl3 - z - t0z)*(\cos(bta)*xtl3 + \sin(bta)*\sin(gma)*ytl3 + \sin(bta)*\cos(gma)*ztl3)$ $(3,6) = 2*(xb3 - \cos(afa)*\cos(bta)*xtl3 - (\cos(afa)*\sin(bta)*\sin(gma) - \sin(afa)*\cos(gma))*ytl3 - (\cos$ $(afa)*\sin(bta)*\cos(gma)+\sin(afa)*\sin(gma))*ztl3-x-t0x)*(-(\cos(afa)*\sin(bta)*\cos(gma)+\sin(afa)*\sin(gma))*ytl3-(-\cos(afa)*\sin(bta)*\sin(gma)+\sin(afa)*\cos(gma))*ztl3)+2*(yb3-\sin(afa)*\cos(bta)*xtl3-(\sin(afa)*\sin(bta)*\sin(gma)+\cos(afa)*\cos(gma))*ytl3-(\sin(afa)*\sin(bta)*\cos(gma)-\cos(afa)*\sin(gma))*ztl3-y-t0y)*(-(\sin(afa)*\sin(bta)*\cos(gma)-\cos(afa)*\sin(gma))*ytl3-(-\sin(afa)*\sin(bta)*\sin(gma)-\cos(afa)*\cos(gma))*ztl3)+2*(zb3+\sin(bta)*xtl3-\cos(bta)*\sin(gma)*ytl3-\cos(bta)*\cos(gma)*ztl3-z-t0z)*(-\cos(bta)*\cos(gma)*ytl3+\cos(bta)*\sin(gma)*ztl3)$ $(4,1)=-2*xb4+2*\cos(afa)*\cos(bta)*xtl4+2*(\cos(afa)*\sin(bta)*\sin(gma)-\sin(afa)*\cos(gma))*ytl4+2*(\cos(afa)*\sin(bta)*\cos(gma)+\sin(afa)*\sin(gma))*ztl4+2*x+2*t0x$ $(4,2)=-2*yb4+2*\sin(afa)*\cos((bta)*xtl4+2*(\sin(afa)*\sin(bta)*\sin(gma)+\cos(afa)*\cos(gma))*ytl4+2*(\sin(afa)*\sin(bta)*\cos(gma)-\cos(afa)*\sin(gma))*ztl4+2*y+2*t0y$ $(4,3)= -2*zb4-2*\sin(bta)*xtl4+2*\cos(bta)*\sin(gma)*ytl4+2*\cos(bta)*\cos(gma)*ztl4+2*z+2*t0z$ $(4,4)=2*(xb4-\cos(afa)*\cos(bta)*xtl4-(\cos(afa)*\sin(bta)*\sin(gma)-\sin(afa)*\cos(gma))*ytl4-(\cos(afa)*\sin(bta)*\cos(gma)+\sin(afa)*\sin(gma))*ztl4-x-t0x)*(\sin(afa)*\cos(bta)*xtl4-(-\sin(afa)*\sin(bta)*\sin(gma)-\cos(afa)*\cos(gma))*ytl4-(-\sin(afa)*\sin(bta)*\cos(gma)+\cos(afa)*\sin(gma))*ztl4)+2*(yb4-\sin(afa)*\cos(bta)*xtl4-(\sin(afa)*\sin(bta)*\sin(gma)+\cos(afa)*\cos(gma))*ytl4-(\sin(afa)*\sin(bta)*\cos(gma)-\cos(afa)*\sin(gma))*ztl4-y-t0y)*(-\cos(afa)*\cos(bta)*xtl4-(\cos(afa)*\sin(bta)*\sin(gma)-\sin(afa)*\cos(gma))*ytl4-(\cos(afa)*\sin(bta)*\cos(gma)+\sin(afa)*\sin(gma))*ztl4)$ $(4,5)=2*(xb4-\cos(afa)*\cos(bta)*xtl4-(\cos(afa)*\sin(bta)*\sin(gma)-\sin(afa)*\cos(gma))*ytl4-(\cos(afa)*\sin(bta)*\cos(gma)+\sin(afa)*\sin(gma))*ztl4-x-t0x)*(\cos(afa)*\sin(bta)*xtl4-\cos(afa)*\cos(bta)*\sin(gma)*ytl4-\cos(afa)*\cos(bta)*\cos(gma)*ztl4)+2*(yb4-\sin(afa)*\cos(bta)*xtl4-(\sin(afa)*\sin(bta)*\sin(gma)+\cos(afa)*\cos(gma))*ytl4-(\sin(afa)*\sin(bta)*\cos(gma)-\cos(afa)*\sin(gma))*ztl4-y-t0y)*(\sin(afa)*\sin(bta)*xtl4-\sin(afa)*\cos(bta)*\sin(gma)*ytl4-\sin(afa)*\cos(bta)*\cos(gma)*ztl4)+2*(zb4+\sin(bta)*xtl4-\cos(bta)*\sin(gma)*ytl4-\cos(bta)*\cos(gma)*ztl4-z-t0z)*(\cos(bta)*xtl4+\sin(bta)*\sin(gma)*ytl4+\sin(bta)*\cos(gma)*ztl4)$ $(4,6)=2*(xb4-\cos(afa)*\cos(bta)*xtl4-(\cos(afa)*\sin(bta)*\sin(gma)-\sin(afa)*\cos(gma))*ytl4-(\cos(afa)*\sin(bta)*\cos(gma)+\sin(afa)*\sin(gma))*ztl4-x-t0x)*(-(\cos(afa)*\sin(bta)*\cos(gma)+\sin(afa)*\sin(gma))*ytl4-(-\cos(afa)*\sin(bta)*\sin(gma)+\sin(afa)*\cos(gma))*ztl4)+2*(yb4-\sin(afa)*\cos(bta)*xtl4-(\sin(afa)*\sin(bta)*\sin(gma)+\cos(afa)*\cos(gma))ytl4-(\sin(afa)*\sin(bta)*\cos(gma)-\cos(afa)*\sin(gma))*ztl4-y-t0y)*(-(\sin(afa)*\sin(bta)*\cos(gma)-\cos(afa)*\sin(gma))*ytl4-(-\sin(afa)*\sin(bta)*\sin(gma)-\cos(afa)*\cos(gma))*ztl4)+2*(zb4+\sin(bta)*xtl4-\cos(bta)*\sin(gma)*ytl4-\cos(bta)*\cos(gma)*ztl4-z-t0z)*(-\cos(bta)*\cos(gma)*ytl4+\cos(bta)*\sin(gma)*ztl4)$ $(5,1)=-2*xb5+2*\cos(afa)*\cos(bta)*xtl5+2*(\cos(afa)*\sin(bta)*\sin(gma)-\sin(afa)*\cos(gma))*ytl5+2*(\cos(afa)*\sin(bta)*\cos(gma)+\sin(afa)*\sin(gma))*ztl5+2*x+2*t0x$ $(5,2)=-2*yb5+2*\sin(afa)*\cos(bta)*xtl5+2*(\sin(afa)*\sin(bta)*\sin(gma)+\cos(afa)*\cos(gma))*ytl5+2*(\sin(afa)*\sin(bta)*\cos(gma)-\cos(afa)*\sin(gma))*ztl5+2*y+2*t0y$ $(5,3)=-2*zb5-2*\sin(bta)*xtl5+2*\cos(bta)*\sin(gma)*ytl5+2*\cos(bta)*\cos(gma)*ztl5+2*z+2*t0z$ $(5,4)=2*(xb5-\cos(afa)*\cos(bta)*xtl5-(\cos(afa)*\sin(bta)*\sin(gma)-\sin(afa)*\cos(gma))*ytl5-(\cos(afa)*\sin(bta)*\cos(gma)+\sin(afa)*\sin(gma))*ztl5-x-t0x)*(\sin(afa)*\cos(bta)*xtl5-(-\sin(afa)*\sin(bta)*\sin(gma)-\cos(afa)*\cos(gma))*ytl5-(-\sin(afa)*\sin(bta)*\cos(gma)+\cos(afa)*\sin(gma))*ztl5)+2*(yb5-\sin(afa)*\cos(bta)*xtl5-(\sin(afa)*\sin(bta)*\sin(gma)+\cos(afa)*\cos(gma))*ytl5-(\sin(afa)*\sin(bta)*\cos(gma)-\cos(afa)*\sin(gma))*ztl5-y-t0y)*(-\cos(afa)*\cos(bta)*xtl5-(\cos(afa)*\sin(bta)*\sin(gma)-\sin(afa)*\cos(gma))*ytl5-(\cos(afa)*\sin(bta)*\cos(gma))+\sin(afa)*\sin(gma))*ztl5)$ $(5,5)=2*(xb5-\cos(afa)*\cos(bta)*xtl5-(\cos(afa)*\sin(bta)*\sin(gma)-\sin(afa)*\cos(gma))*ytl5-(\cos(afa)*\sin(bta)*\cos(gma)+\sin(afa)*\sin(gma))*ztl5-x-t0x)*(\cos(afa)*\sin(bta)*xtl5-\cos(afa)*\cos(bta)*\sin(gma)*ytl5-\cos(afa)*\cos(bta)*\cos(gma)*ztl5)+2*(yb5-\sin(afa)*\cos(bta)*xtl5-(\sin(afa)*\sin(bta)*\sin(gma)+\cos(afa)*\cos(gma))*ytl5-(\sin(afa)*\sin(bta)*\cos(gma)-\cos(afa)*\sin(gma))*ztl5-y-t0y)*(\sin(afa)*\sin(bta)*xtl5-\sin(afa)*\cos(bta)*\sin(gma)*ytl5-\sin(afa)*\cos(bta)*\cos(gma)*ztl5)+2*(zb5+\sin(bta)*xtl5-\cos(bta)*\sin(gma)*ytl5-\cos(bta)*\cos(gma)*ztl5-z-t0z)*(\cos(bta)*xtl5+\sin(bta)*\sin(gma)*ytl5+\sin(bta)*\cos(gma)*ztl5)$ $(5,6)=2*(xb5-\cos(afa)*\cos(bta)*xtl5-(\cos(afa)*\sin(bta)*\sin(gma)-\sin(afa)*\cos(gma))*ytl5-(\cos(afa)*\sin(bta)*\cos(gma)+\sin(afa)*\sin(gma))*ztl5-x-t0x)*(-(\cos(afa)*\sin(bta)*\cos(gma)+\sin(afa)*\sin(gma))*ytl5-(-\cos(afa)*\sin(bta)*\sin(gma)+\sin(afa)*\cos(gma))*ztl5)+2*(yb5-\sin(afa)*\cos(bta)*xtl5-(\sin(afa)*\sin(bta)*\sin(gma)+\cos(afa)*\cos(gma))*ytl5-(\sin(afa)*\sin(bta)*\cos(gma)-\cos(afa)*\sin(gma))*ztl5-y-t0y)*(-(\sin(afa)*\sin(bta)*\cos(gma)-\cos(afa)*\sin(gma))*ytl5-(-\sin(afa)*\sin(bta)*\sin(gma)-\cos(afa)*\cos(gma))*ztl5)+2*(zb5+\sin(bta)*xtl 5-\cos(bta)*\sin(gma)*ytl5-\cos(bta)*\cos((gma))*ztl5-z-t0z)*(-\cos(bta)*\cos(gma)*ytl5+\cos(bta)*\sin(gma)*ztl5)$ $(6,1)=-2*xb6+2*\cos(afa)*\cos(bta)*xtl6+2*(\cos(afa)*\sin(bta)*\sin(gma)-\sin(afa)*\cos(gma))*ytl6+2*(\cos(afa)*\sin(bta)*\cos(gma)+\sin(afa)*\sin(gma))*ztl6+2*x+2*t0x$ $(6,2)=-2*yb6+2*\sin(afa)*\cos(bta)*xtl6+2*(\sin(afa)*\sin(bta)*\sin(gma)+\cos(afa)*\cos(gma))*ytl6+2*(\sin(afa)*\sin(bta)*\cos(gma)-\cos(afa)*\sin(gma))*ztl6+2*y+2*t0y$ $(6,3)=-2*zb6-2*\sin(bta)*xtl6+2*\cos(bta)*\sin(gma)*ytl6+2*\cos(bta)*\cos(gma)*ztl6+2*z+2*t0z$ $(6,4)=2*(xb6-\cos(afa)*\cos(bta)*xtl6-(\cos(afa)*\sin(bta)*\sin(gma)-\sin(afa)*\cos(gma))*ytl6-(\cos(afa)*\sin(bta)*\cos(gma)+\sin(afa)*\sin(gma))*ztl6-x-t0x)*(\sin(afa)*\cos(bta)*xtl6-(-\sin(afa)*\sin(bta)*\sin(gma)-\cos(afa)*\cos(gma))*ytl6-(-\sin(afa)*\sin(bta)*\cos(gma)+\cos(afa)*\sin(gma))*ztl6)+2*(yb6-\sin(afa)*\cos(bta)*xtl6-(\sin(afa)*\sin(bta)*\sin(gma)+\cos(afa)*\cos(gma))*ytl6-(\sin(afa)*\sin(bta)*\cos(gma)-\cos(afa)*\sin(gma)*ztl6-y-t-0y)*(-\cos(afa)*\cos(bta)*xtl6-(\cos(afa)*\sin(bta)*\sin(gma)-\sin(afa)*\cos(gma))*ytl6-(\cos(afa)*\sin(bta)*\cos(gma)+\sin(afa)*\sin(gma))*ztl6)$ $(6,5)=2*(xb6-\cos(afa)*\cos(bta)*xtl6-(\cos(afa)*\sin(bta)*\sin(gma)-\sin(afa)*\cos(gma))*ytl6-(\cos(afa)*\sin(bta)*\cos(gma)+\sin(afa)*\sin(gma))*ztl6-x-t0x)*(\cos(afa)*\sin(bta)*xtl6-\cos(afa)*\cos(bta)*\sin(gma)*ytl6-\cos(afa)*\cos(bta)*\cos(gma)*ztl6)+2*(yb6-\sin(afa)*\cos(bta)*xtl6-(\sin$ $(afa)*\sin(bta)*\sin(gma)+\cos(afa)*\cos(gma))$
$*ytl6-(\sin(afa)*\sin(bta)*\cos(gma)-\cos(afa)*\sin$
$(gma))*ztl6-y-t0y)*(\sin(afa)*\sin(bta)*xtl6-\sin$
$(afa)*\cos(bta)*\sin(gma)*ytl6-\sin(afa)*\cos(bta)$
$*\cos(gma)*ztl6)+2*(zb6+\sin(bta)*xtl6-\cos(bta)$
$*\sin(gma)*ytl6-\cos(bta)*\cos(gma)*ztl6-z-t0z)*$
$(\cos(bta)*xtl6+\sin(bta)*\sin(gma)*ytl6+\sin(bta)$
$*\cos(gma)*ztl6)$ $(6,6)=$ $2*(xb6-\cos(afa)*\cos(bta)*xtl6-(\cos(afa)*\sin(bta)*\sin$
$(gma)-\sin(afa)*\cos(gma))*ytl6-(\cos(afa)*\sin(bta)*\cos$
$(gma)+\sin(afa)*\sin(gma))*ztl6-x-t0x)*(-(\cos(afa)*\sin$
$(bta)*\cos(gma)+\sin(afa)*\sin(gma))*ytl6-(-\cos(afa)*\sin$
$(bta)*\sin(gma)+\sin(afa)*\cos(gma))*ztl6)+2*(yb6-\sin(afa)$
$*\cos(bta)*xtl6-(\sin(afa)*\sin(bta)*\sin(gma)+\cos(afa)*\cos$
$(gma))*ytl6-(\sin(afa)*\sin(bta)*\cos(gma)-\cos(afa)*\sin$
$(gma))*ztl6-y-t0y)*(-(\sin(afa)*\sin(bta)*\cos(gma)-\cos$
$(afa)*\sin(gma))*ytl6-(-\sin(afa)*\sin(bta)*\sin(gma)-\cos$
$(afa)*\cos(gma))*ztl6)+2*(zb6+\sin(bta)*xtl6-\cos(bta)*\sin$
$(gma)*ytl-\cos(bta)*\cos(gma)*ztl6-z-t0z)*(-\cos(bta)*\cos$
$(gma)*ytl6+\cos(bta)*\sin(gma)*ztl6)$

What is claimed is:

1. An apparatus for use in calibrating relative motions of moveable parts comprising: a plurality of balls rotatably mounted to a plurality of telescopic rods, and a plurality of linear encoders mounted inside the telescopic rods which form configurations to measure changes in the length or movement of the balls in relation to the telescopic rods to calculate multiple translational, angular and squareness errors simultaneously, wherein at least one of the balls is arranged to contact a surface found on a measuring site, and wherein the apparatus allows measurements to be performed on non-flat surfaces of the measuring site as the plurality of balls at the measuring site can be oriented in a nonplanar arrangement.

2. A method of calibrating relative motions of moveable parts comprising contacting the moveable part to the apparatus of claim 1 so that the linear encoders relay data which measures translational, angular and squareness errors, and calibrating the moveable part based upon the data collected.

3. An apparatus for use in calibrating relative movements of parts of a machine comprising: a plurality of balls rotatably mounted to a plurality of telescopic rods, linear encoders mounted inside the telescopic rods which linear encoders measure changes in length or movement of the ball in relation to the telescopic rods, a top platform contacted to at least one ball, and a bottom platform formed by at least one of the balls being magnetically adhered to a surface on a measuring site, to form a configuration which measures multiple translational, angular and squareness errors simultaneously for planar and non-planar movements of a machine, wherein the plurality of balls can be oriented in a non-planar arrangement at the top platform or bottom platform.

4. A method of calibrating a machine tool for translational, angular and squareness errors comprising mounting the apparatus of claim 3 between members to be measured wherein the bottom platform of the apparatus is mounted on the machine tool and the top platform of the apparatus is mounted on a fixed position of the machine tool, after the apparatus is mounted the machine tool is programmed to move and the apparatus measures the motion of the machine tool for translational, angular and squareness errors.

* * * * *